United States Patent [19]
Simonin et al.

[11] 3,826,161
[45] July 30, 1974

[54] MOVEMENT CONTROL DEVICE FOR A SINGLE OR MULTI-SPINDLE DEVICE ON AN AUTOMATIC LOOSE-HEAD MACHINE TOOL

[75] Inventors: Jean-Claude Simonin, Moutier; Jean-Daniel Badoux, Nyon, both of Switzerland

[73] Assignee: Fabrique de Machines Andre Bechler S. A., Moutier/BE, Switzerland

[22] Filed: Sept. 28, 1972

[21] Appl. No.: 293,161

[30] Foreign Application Priority Data
Oct. 1, 1971   Switzerland.................. 14295/71

[52] U.S. Cl. ........................... 82/2 B, 82/3
[51] Int. Cl. ..................... B23b 3/00, B23b 3/34
[58] Field of Search ............ 82/2, 2 B, 2 C, 3

[56] References Cited
UNITED STATES PATENTS
2,384,809  9/1945  Bullard et al................ 82/2 B X
2,892,526  6/1959  Devaud............................. 82/2 B
3,075,418  1/1963  Mobius.............................. 82/2

Primary Examiner—Harrison L. Hinson
Attorney, Agent, or Firm—Werner W. Kleeman

[57] ABSTRACT

A movement control device for a single or multi-spindle device on an automatic loose-head machine tool. The machine tool comprises a mobile headstock for carrying a workpiece, a main camshaft for controlling the movement of the headstock, and tool means for carrying out first machining operations on said workpiece. The single or multi-spindle device is arranged facing the headstock for carrying out second machining operations on the workpiece simultaneously with the first machining operations and comprising fluid pressure-or electrically operated drive means to move the spindles axially. The movement control device comprises electrical control means for controlling the drive means so that in operation the axial displacement of each spindle is a function of both the speed of displacement and the position of the headstock.

13 Claims, 5 Drawing Figures

MOVEMENT CONTROL DEVICE FOR A SINGLE OR MULTI-SPINDLE DEVICE ON AN AUTOMATIC LOOSE-HEAD MACHINE TOOL

BACKGROUND OF THE INVENTION

This invention relates to a movement control device for a single or multi-spindle device on or at an automatic loose-head machine tool, that is to say, for an automatic machine tool in which, during machining, a workpiece is moved together with a headstock carrying the workpiece, as against an automatic fast-head machine tool in which the workpiece and the headstock are fixed during machining.

Many types of automatic head and loose-head machine tools are known but, since the best known types of said automatic machines are automatic fixed-head and loose-head lathes, in the discussion and description which follow reference will be made to said automatic lathes.

The automatic fixed-head or loose-head lathes are commonly equipped with a multi-spindle device, although in some cases a single-spindle device, oriented to face the lathe headstock, and by means of which it is possible to undertake axial drilling, tapping, boring and other operations on the workpiece whose outside is moreover machined by means of cutters or other tools situated close to the headstock. In automatic fast-head lathes, the cycle of operations of the spindles may be made independent of the cycle of machining operations on the outside of the workpiece, provided that this workpiece retains the same axial position with respect to the lathe frame throughout its machining operation. The same does not apply in the case of automatic loose-head lathes, wherein the headstock and the workpiece it carries are displaced axially in order to perform the external machining operation, which imposes the need to allow for the axial speed of the headstock to establish the axial penetration speeds of the spindles. If the axial movements of the spindles are controlled direct by means of cams, at the same time as the axial movements of the headstock, a set of cams whose outline depends on the set of cams controlling the displacements of the headstock will thus have to be incorporated.

Apart from the fact that this causes a substantial complication in the calculations regarding the spindle advance cams, this situation also causes another disadvantage which consists in that any subsequent modification of the set of cams controlling the movements of the headstock (for example for a relatively minor modification of the external profile of the workpiece to be machined, or to modify the working speed during a stage of the external machining operation) renders it mandatory to make a modification in the set of cams controlling the spindle displacements, even if the internal machining operations performed by these spindles are not modified in any way.

This need to make allowance for the headstock advance program to determine the advance and return program of the spindles, renders it even more difficult to introduce any possible subsequent modifications in the axial displacement program of the spindles. It is known that clearing operations must be performed in order to produce drillings of a depth exceeding approximately three times the diameter of the hole, the spindle thus being withdrawn until the drilling tool emerges completely from the workpiece (on the one hand to facilitate swarf removal and on the other hand to allow relubrication of the tool cutting edges), after which the spindle is again advanced to resume the drilling operation. It would be convenient upon occasion to be able to introduce an unscheduled clearing operation into a cycle of operations, or to modify the dimension at which particular clearing actions had initially been scheduled. If the displacement of the spindles is controlled by cams, a modification of this kind demands substantial conversions of the cams controlling the displacements of the spindles, these conversions proving to be particularly difficult and troublesome in the case in which it is apt to make complementary allowance for the axial displacement program of the headstock. It is thus preferable, provided this is possible, to eschew conversions of this kind, at the cost of failing to secure optimum clearing conditions.

It is possible to contemplate, in particular on the score of convenience of design, to control the axial displacement of the spindles in indirect manner, for example hydraulically (or possibly pneumatically or else electrically). In a case of this nature, the axial displacement of the spindles nevertheless remains wholly determined by a set of cams moving as a function of the principal camshaft of the lathe, the hydraulic transmission then proving to be a less bulky device for positive transmission of an impulsion still originating from a cam, the difficulties previously cited not being lessened thereby in any way.

SUMMARY OF THE INVENTION

According to one aspect of the present invention there is provided a movement control device for a single spindle or multi-spindle device on an automatic loose-head machine tool, said machine tool comprising a mobile headstock for carrying a workpiece, a main camshaft for controlling the movement of said headstock, and tool means for carrying out first machining operations on said workpiece. The single or multi-spindle device is arranged facing the headstock for carrying out second machining operations on the workpiece simultaneously with the first machining operations and comprising fluid pressure-or electrically operated drive means to move the spindles axially. The movement control device comprises electrical control means for controlling the drive means so that in operation the axial displacement of each spindle is a function of both the speed of displacement and position of the headstock.

In the movement control device for a single spindle or multi-spindle device as set forth in the preceding paragraph, said control means may preferably comprise:

positional pickup devices for detecting and converting into an electrical value the position of the headstock;

positional pickup devices for detecting and converting into an electrical value the axial position of the spindles;

speed pickup devices for detecting and converting into an electrical value the speed of displacement of the headstock;

positional comparator devices for establishing an electrical value representing the relative position of the spindles and the headstock as a function of the outputs of said positional pickup devices;

devices for marking one or more reference settings for the said relative position, which reference setting correspond to points at which changes in spindle axial displacement are due to intervene during the consecutive stages of activation of each of said spindles;

a first logic operation control device for selection of the reference settings, operating as a function of the cycle of operations of the spindles;

devices for detection of coincidences between the said relative position and the reference setting selected by the said first logic operation control device;

devices for marking one or more values of relative axial speed as between each spindle and the headstock, specified for machining by means of tools carried by these spindles;

devices for determining absolute speed values for the rapid advance and rapid return of the spindles;

a second logic operation control device for selection of the schedules relative speed values, and for comparison between the value of the schedules relative speed selected and the actual speed of displacement of the headstock, this comparison providing a positive or negative absolute speed value scheduled for the displacement of the spindles during the machining operation;

a third logic operation control device for selection of the positive or negative absolute values to be consecutively applied to the spindles in the course of a complete cycle of operations, these values among which this selection is made originating from at least the second logic operation control device and from said devices for determining absolute rapid speed values, this third logic operation control device being devised to provide an absolute speed datum for the displacement of the spindles, and for inducing the intervention therein of changes and reversals in the speed of the spindles as a function of data provided by the said coincidence detector devices, as well as by a sequential programming unit, this third logic operation control deice moreover supplying the said first logic operation control device with at least a part of the sequential data required to control its cycle of selections of consecutive reference settings;

devices for establishing positive response or servo-control in value and direction between the speed of displacement of the spindles and the value determined by the said absolute speed datum supplied by the third logic operation control device.

According to another aspect of the present invention there is provided an electrical control device for controlling fluid pressure or electrically operated drive means for axial movement of the spindle or spindles of a single or multi-spindle device provided on an automatic loose-head machine tool; said machine tool comprising a mobile headstock for carrying a workpiece, a main camshaft for controlling the movement of said headstock, and tool means for carrying out first machining operations on said workpiece, and the spindle device being arranged facing the headstock for carrying out second machining operation; the electrical control device controlling said fluid pressure or electrically operated drive means, so that in operation the axial displacement of each spindle of said single or multi-spindle device is a function of both the speed of displacement and the position of the headstock.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Considering the drawings at this juncture, a sliding head 1 (FIG. 3) is situated facing a spindle-carrier block 2 carrying three spindles 2a, 2b, 2c, the spindle 2a being shown in the axis of the headstock. It should be clearly understood that, on specific drive impulses or impulsions the spindle-carrier block 2 oscillates in a plane at right angles to that of FIG. 2 to bring the spindle 2a, 2b, or 2c into the axis of the headstock, as the case may be.

Figure 2:
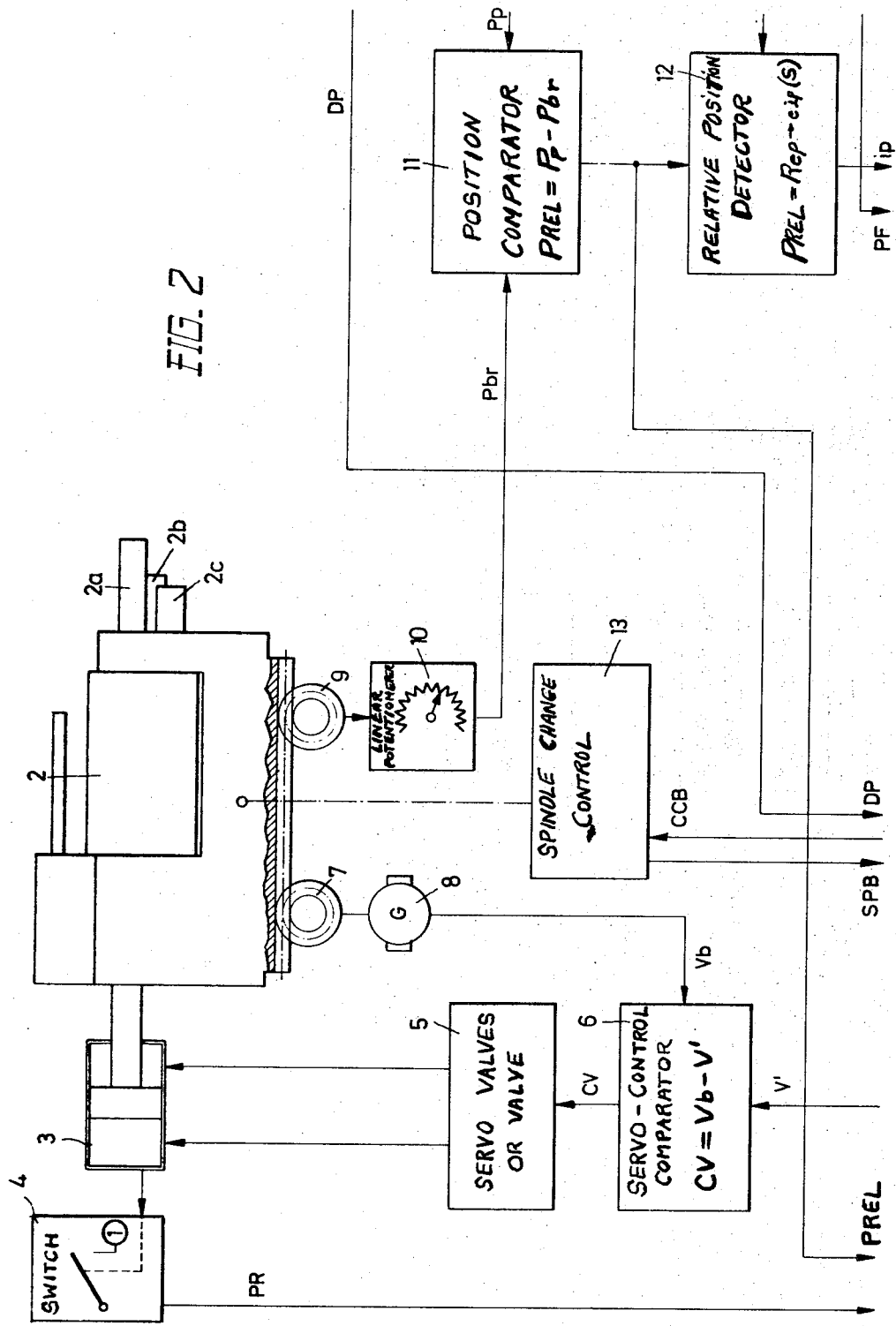
FIGS. 2, 3, 4 and 5 correspondingly illustrate the four parts of the functional diagram of a device for controlling the advance and return of the spindles on an automatic loose-head lathe, these figures being intended to be combined in the manner shown by FIG. 1.

In FIG. 2, and behind the spindle-carrier block 2, there is an hydraulic or pneumatic element 3 intended to propel and withdraw the spindles. This element 3 is connected to a switch 4 which is closed when the spindles have been fully drawn back; the function of this switch 4 will be described further on. A servo valve or a set of servo valves 5 is arranged to control the element 3 as a function of a valve control datum CV delivered thereto by a servo-control comparator 6. The spindle-carrier block 2 is displaced axially to cause the spindles to advance under the control of the element 3, and below this spindle-carrier block 2 is apparent a rack and pinion mechanism 7 arranged to convert the speed of longitudinal displacement of the spindles into a speed of rotation. This speed of rotation is transmitted to a tachometric generator 8 which thus delivers a datum or data in the form of an electrical voltage Vb proportional to the speed of axial displacement of the spindles. This datum Vb is supplied to the comparator 6 which, in a manner which will be examined at a later stage, moreover receives a speed datum V' representing the speed of translation scheduled or intended for the spindles. This speed of translation may be positive or negative. The comparator 6 compares the true speed datum Vb it receives from the tachometric generator 8 with the translation speed datum V' scheduled for the spindles, and as a function of this comparison, it feeds a datum CV to the servo valves 5 in such manner as to cause these to reduce, increase or reverse the actual speed of translation of the spindles, as the case may be, until this is equal to the speed denoted by the datum V'. This represents a conventional speed coupling device which does not require any more detailed explanations.

Another rack and pinion device 9 converts the translatory displacement of the spindles into a rotary displacement, and places a linear potentiometer 10 in a position which thus represents the axial position of the spindles. This potentiometer 10 thus establishes a "spindle position" datum Pbr in the form of a voltage varying linearly with the spindle position. This datum Pbr is fed to a position comparator 11 which also receives another datum Pp linearly representing the axial position of the headstock 1. As apparent from FIG. 3, this datum Pp is obtained in a manner analogous to that employed for the datum Pbr, by means of a rack and pinion mechanism 16 and a linear potentiometer 17.

The position comparator 11 establishes a datum for the "relative position of the spindles and the headstock" Prel, from the sum or difference of the positional values Pbr and Pp, which is transmitted to a relative position detector 12. It is appropriate to understand here that, depending on the sign of the voltages generated for the data Pbr and Pp, the position comparator 11 will operate either by subtraction or addition, in such manner that the datum Prel remains the same every time a definite distance prevails between the headstock and the spindles, irrespective of the fact that the headstock is more advanced whilst the spindles are more retracted, or that the headstock is more retracted whilst the spindles are more advanced. When the cutting tip of the tool carried by a spindle is situated just in front of the leading face of the workpiece to be machined which is carried by the headstock 1, the datum Prel should have a zero value. The setting corresponding to these conditions is established in respect of a spindle, for example the spindle 2a, whose tip (or more specifically the tip of the tool it carries) is brought just before the leading face of the workpiece which is to be machined. At this instant, depending on the manner in which the workpiece and the spindle are positioned, the datum Prel will not mandatorily be equal to zero in the first place. To secure this situation, the linear potentiometer 17 has been made adjustable by temporary disconnection, allowing the same to be turned without moving the headstock. The datum Prel may in this manner be made to assume the zero value for the relative zero position of the spindles and headstock, following which the linear potentiometer is connected again in such a manner as to follow the subsequent longitudinal displacements of the headstock 1. A switch feeding the datum Prel voltage to a galvanometer is available within a "manual adjustment control" block 24, in order to be able to verify the zero value of the datum Prel. This galvanometer is of the "central zero position" type, and by reading the same it is possible to see the positional setting of the linear potentiometer 17 for which the datum Prel assumes the zero value.

Once the device has thus been adjusted in respect of one of the spindles, for example the spindle 2a, the other spindles are set in axial position in the same manner as the first spindle, by hand. Thus, for each of the spindles, the position detector 12 will always receive a datum Prel apprising it of the distance between the tip of the spindles and the leading face of the workpiece to be machined, which distance may evidently be positive or negative, since the spindles are scheduled to penetrate into the workpiece to be machined, by drilling action. This datum Prel is of an analog nature, the position detector 12 receiving a more or less positive or more or less negative voltage which will assume the precise value null or nought in the relative zero position.

Figure 3:
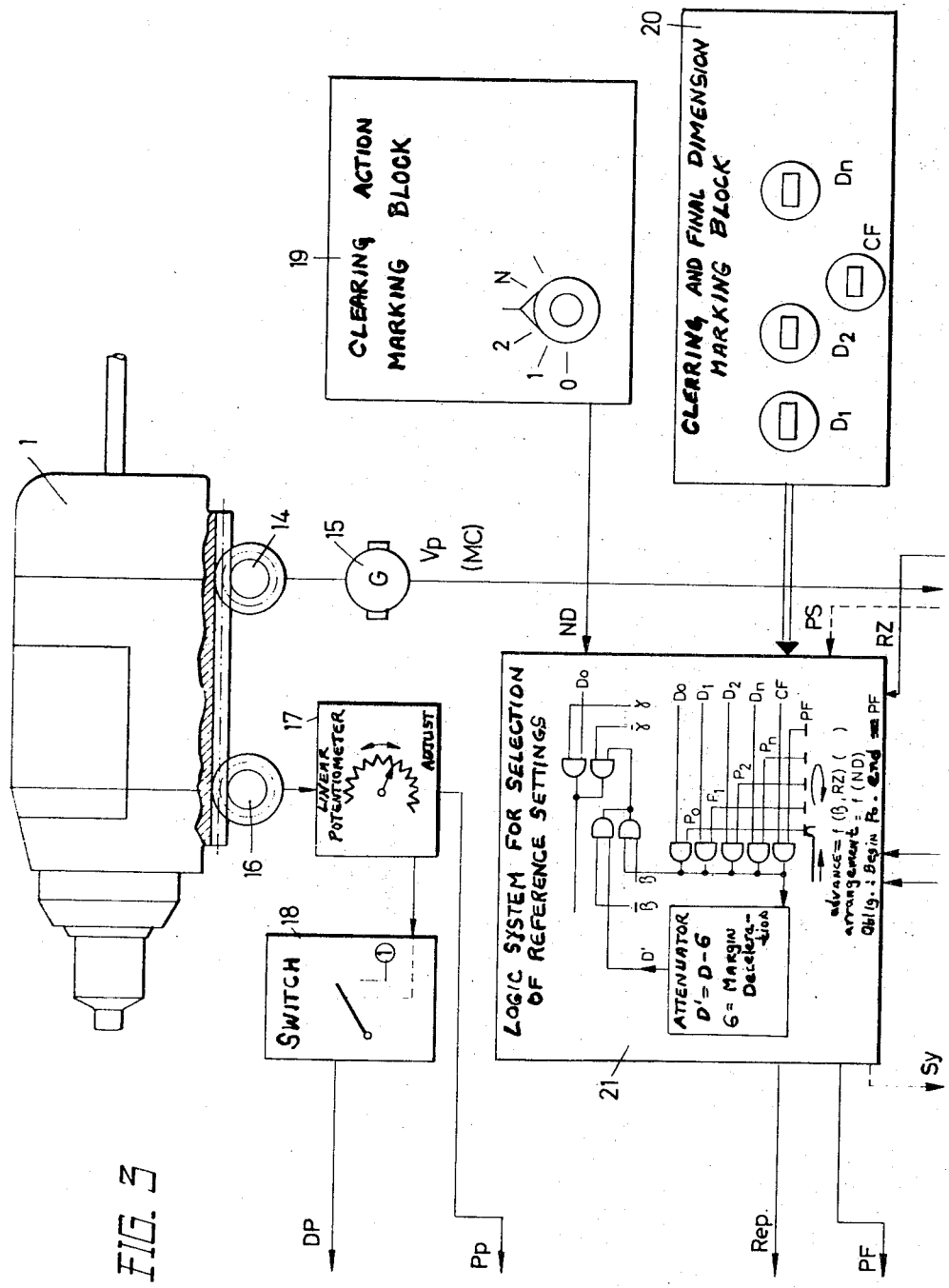

Considering FIGS. 2 and 3, it is apparent that the position detector 12 equally receives a "marking" datum Rep which reaches it from a logic system or logic 21 for selection of the reference marks (FIG. 3). This logic system 21 moreover receives relative reference mark data which are determined in constant manner during operation by marking elements comprised in a block 20 for "marking the extent of the clearing actions and the final dimension." This block 20 comprises a definite number of dimensional marking elements $D_1, D_2 \ldots D_n \ldots$ CF. These elements render it possible to preset and display particular dimensions for the machining process employing the spindles. The elements $D_1$ to $D_n$ serve the purpose of establishing the consecutive depths of penetration which, upon being reached, impose the need for withdrawal of the spindle, either for a clearing action or else for a spindle replacement. The element CF serves the purpose of establishing the final penetration setting, that is to say, the depth to which the last spindle is to penetrate before it is withdrawn upon completion of the machining process employing the spindles.

The dimensional marking block 20 constantly supplies the logic or logical selection system 21 with all the data established by its elements $D_1, D_2 \ldots D_N \ldots$ CF. These data are given in analog form, consisting of higher or lower voltages, in accordance with a reference system corresponding to the reference system of the position comparator (data Pbr and Pp). Since all the possibilities of the $n$ elements of the block 20 for establishing clearing action settings will not be exploited on every occasion, a block 19 has been incorporated for indication of the number of clearing actions applied, wherein a stepping switch renders it possible to display the number of clearing actions actually applied. An analog or digital datum is supplied by this block 19 to the logic system 21 as a function of this stepping switch.

The logic system 21 for selection of the reference settings operates in doubly cyclic manner. In point of fact, it supplies the position detector with reference settings (corresponding to particular relative positions of the spindles and of the headstock) which follow each other in accordance with a first cycle controlled by data originating from another logic system (or logical comparator) whose operation will be examined at a later stage. In accordance with this first cycle, the logic system 21 successively supplies the position detector with: a value corresponding to the point to which the spindle may advance in rapid forward traverse (no machining), then a value corresponding to the point to which the spindle should be brought in slow advance (or machining stroke) at the end of the stage actually being performed, then finally the zero value which is that to which — at least — the spindle should be retracted in rapid return traverse to perform the clearing action (or possibly to change a spindle, in which case the spindle should not only return to the zero position but up to its full withdrawal position, this function however being established elsewhere than in the logic selection system 21).

The logic or logical selection system 21 also performs another cyclic operation which consists in consecutive selection of the different values it receives from the marking block 20, so that on the occasion of each new cycle of the function previously described, it is possible to provide a clearing value of setting (that is to say a setting up to which the spindle will be allowed to advance and which, upon being reached, will impose the need for a retraction of the spindle) chosen one step forward in the series of settings of the marking block 20. This function is represented in the drawings, in the block 21 (FIG. 3), in the manner of the function of an electromechanical selector, but it should be clearly grasped that this method of representation has been chosen only for convenience of illustration and that this cycle of selection could be actually performed in completely electronic manner. The onestep advances of this selection of the clearing settings are controlled by a datum beta ($\beta$) which appears each time a machining stroke is performed. On the other hand, the arrangement of this selection is determined as a function of the datum ND supplied by the block 19 for "marking the number of clearing actions applied." In point of fact, the logic system 21 is devised in such manner that it selects the different marks $D_1$, $D_2$, etc., only up to the setting displayed in the block 19, after which it jumps direct to the selection of the setting CF displayed (final setting). There are different known methods of devising electronic logic elements for operation of a function of this nature; in block 21, it has simply been shown that the progress of the selection is a function of $\beta$, whereas its arrangement is a function of ND. It will also be noted that the first setting selected in the logic selection system 21 is the setting to which the spindle is to be carried by its initial rapid advance prior to performing an initial machining stroke, that is to say, a setting similar to that which would prevail if a preceding drilling operation (in a fictional portion of the workpiece to be machined more forwardly situated than zero) were to have been performed up to the zero setting. Since the setting to which the preceding machining stroke had been taken is always taken as a basis by the logic system to establish the setting to be reached in rapid advance, it is thus necessary at the beginning of the cycle of operations to establish a selection of the zero setting which, always being equal to zero, need not be marked and supplied by the marking block 20. The different stages during which are selected the different settings marked in the block 20 (plus the zero setting) are illustrated as being the stages $P_0$, $P_1$, $P_2$, ... $P_n$ ... PF within the frame representing the logic system 21, in FIG. 3. To characterize the arrangement of the succession of this selection, the two obligatory conditons: "start = $P_0$" and "end = PF," have been shown.

To determine the setting to which the spindle should advance in (forward) rapid traverse, it is advantageous to allow for the fact that, before undertaking the machining stroke, this spindle must undergo a definite degree of deceleration. Provision has thus been made to select the setting at which the rapid traverse should give way to the slow displacement not precisely at the preceding setting for clearance but at a setting corresponding to a somewhat shallower penetration. This is the reason why an "attenuator" element which reduces the setting selected by a deceleration margin sigma ($\sigma$) for transmission of the same to the position detector on the occasion of rapid advance, has been shown in FIG. 3, within the frame representing the logic system or block 21. It should be noted that this attenuator could also be omitted and that the previous clearing setting could simply be transmitted without bothering with the deceleration. The choice between the clearing setting (or final setting) selected, the clearing setting (or final setting) selected and reduced, and the zero setting, may be performed in different ways within the logic selection system 21; solely by way of example, an illustration has been given of the application of gates devised in such manner that in the course of a rapid return (indicated by a datum originating from another logic system) the zero setting is transmitted mandatorily, any other possibility being barred, that in the course of a machining stroke the selected setting is transmitted whilst the possibility of transmitting the reduced selected setting is barred, and that the reduced selected setting is transmitted in the course of a rapid advance whilst barring the possibility of transmitting the undiminished selected setting.

Prior to examining the operation of the absolute speed selection logic system or logic 22 which receives data from the position detector 12 to generate an absolute scheduled speed datum for the spindles and which supplies the logic system 21 with the previously referred to data beta ($\beta$) and gamma ($\gamma$) required for operation of this logic system 21, it is appropriate to make a brief examination of the operation of the elements which perform marking (or preselecting) actions and which generate the fundamental data for the speed of translation of the spindle. These elements comprise a machining speed marking block 27, and a block 28 for the marking of the high rapid advance and return speeds. They equally comprise an element 26 forming a logic selection system or logic and a speed indication comparator. Since there are three spindles, the marking block 27 comprises three marking elements $AL_1$, $AL_2$, $AL_3$ for the machining stroke displacement (slow relative advance), of which each delivers an analog datum for one of the three spindles, in respect of the speed at which each spindle should penetrate into the workpiece to be machined during the processing stages. These three elements equally display the speed corresponding to the slow relative speed datum they feed to the element 26. Within its portion forming a logic selection system, this element performs a selection, as a function of a datum CCB reaching it from a programmer to apprise it of which of the three spindles is positioned facing the headstock, of the speed marked in the block 27 for the corresponding spindle. A selection device of the electromechanical type has equally been shown in the block representing the element 26 (FIG. 5), but this is merely intended for convenience of illustration and it is apt to understand that this selection could be advantageously performed by electronic means. The element 26 equally receives a datum Vp relating to the axial speed of displacement of the feedstock. Within its portion forming a comparator, this element 26 subtracts the value Vp representing the speed of the headstock from the machining stroke speed selected among the data supplied by the block 27. It should be noted that if the relative machining speed (AL) selected is lower than the axial speed (VP) of advance of the headstock, the absolute speed (ML) of the spindle could be negative, the relative speed nevertheless being positive for machining. Thus, this logic or logical operating system 26 for selection and comparison of speed data provides an analog output datum for the slow movement ML in respect of the absolute speed (value and direction) which the spindle should have for its machining penetration into the workpiece to be machined. The "rapid speed marking" block 28 equally comprises two elements RR (rapid return) and AR (rapid advance) for the marking (or preselection) of the rapid advance and rapid return speeds. In the device described, provision has thus been made for adjustability of the rapid advance and return speeds, but it is clear that since these speeds do not have to be determined in very precise manner, it would equally be to perform a non-adjustable determination of these rapid advance and return speeds. On the other hand, since the speed of axial displacement of the headstock will always be low compared to the rapid advance and return speeds, it is possible with respect to these latter to forgo a subtractive comparison with the axial speed of the headstock, and the values of the rapid speeds determined in block 28 may be transmitted without further processing to the logic operating system 22 determining their selection.

It is appropriate at this juncture to examine the working of the logic operating system 22 which performs the selection of the different speeds to be imparted to the spindles, in particular as a function of data *ip* fed to the same by the position detector 12. By means of data relating to the absolute speeds which should appropriately be imparted to the spindle depending on the operational stages, the logic operating system 22 receives the "slow displacement" datum ML coming from the logic selection and comparison operating system 26, and the "rapid advance" AR and "rapid return" RR data coming from the rapid speed marking block 28, these speed data being absolutely necessary for the working of the logic operating system 22. In the embodiment illustrated, the latter also receives another speed datum which is not needed for its primary functions but which is useful for auxiliary functions of this operating system. This consists of the "compensatory movement" speed datum MC which merely consists of the datum corresponding to the absolute speed of axial displacement of the headstock, which speed should equally be imparted to the spindles if it is wished for the relative speed of the headstock with respect to the spindle to be equal to null. This speed datum MC merely consists of the datum Vp produced mainly to have as its destination the logic selection and comparison operating system 26 by means of a tachometric generator 15 driven at a speed proportional to the speed of displacement of the headstock, which speed is picked up by means of a rack and pinion device 14 similar to the rack and pinion device 7 which, as has been seen, fulfills the same purpose for the spindles.

The logic operating system 22 also receives a definite number of other data, on the one hand, from a programmer 29 which will be considered at a later stage and, on the other hand, data PR from control elements comprising the "idle position" switch 4, data DP from switch 18 giving warning of a possible "inadmissible advance of the headstock," and data BA from two switches connected in parallel, the one being situated in the element producing "operation without automatic marking of the settings" (which will be examined at a later stage), and the other in the "control element for manual adjustment." Like the other two logic or logical operating systems, the logic or logical operating system 22 firstly comprises a section for selection of the speed data fed to its input terminal. This selecting section of the logic operating system 22 is so devised that it may operate in accordance with two different cycles: a first cycle comprising three consecutive stages alpha ($\alpha$), beta ($\beta$) and gamma ($\gamma$), during which are correspondingly selected the rapid advance, slow displacement and rapid return, and a second cycle comprising four consecutive stages alpha ($\alpha$), beta ($\beta$), gamma' ($\gamma'$) and gamma ($\gamma$), during which are correspondingly selected the rapid advance, slow displacement, compensatory displacement and rapid return. This second cycle is not applied until and unless the machining operations are in their final stage, that is to say, when the logic operating system 21 has selected the final setting CF, the datum denoting that the final stage has been reached being transmitted from the logic system 21 to the logic system 22 in the form of a logic (binary) datum PF. The interpretation of this binary logic datum in the logic operating system 22 is illustrated in the drawing (block 22, FIG. 4) by way of logical equations, the notation PF denoting the presence of the datum according to which the final stage has been reached, and the notation $\overline{PF}$ denoting the absence of the datum PF, that is to say, denoting that the final stage has not been reached. It may be observed from the start that the same system of representation by logical equations is employed for all the logical data reaching the logic operating system 22, whilst noting however that the datum *ip* coming from the position detector 12 and denoting that the true relative position of the headstock with respect to the spindles corresponds to the reference setting supplied by the logic system 21, is depicted in the drawing as a datum delivered in the form of a pulse, which is the reason for not employing the notation $\overline{ip}$. The speed data ML, MC, AR and RR constitute analog data which certainly do not allow of such notations. It is apparent from the righthand part of the logic operating system 22 that the alpha ($\alpha$), beta ($\beta$), gamma ($\gamma$) selection is performed as a function of ip, provided that $\overline{PF}$ (no PF) is in operation, whereas in the case of PF, it is the alpha ($\alpha$), beta ($\beta$), gamma' ($\gamma'$), gamma ($\gamma$) selection which is performed as a function of *ip*. During the machining stages followed by clearing operations, the following will thus occur: a rapid advance up to close to the setting reached by the preceding machining operation, a slow displacement up to the setting of the next clearing action, then a rapid return to the zero setting, followed by another rapid advance up to the former clearing setting, etc... By contrast, during the final stage in which the tool penetrates to the maximum depth into the workpiece to be machined, a period corresponding to gamma' ($\gamma'$) during which the spindle is displaced axially by a compensatory movement only which will keep its position constant with respect to the headstock, will intervene after the rapid advance and the slow advance up to the final setting. The time during which this "finishing action" persists is determined by a retarder 23 adjustable between null and a maximum of 5 or 6 seconds (2 to 3 seconds as a typical case).

The logic operating system 22 is devised to operate as a function of a programming unit which, within the mode of automatic operation described herein, principally provides the two instructions "start" and "spindle change" (or, more precisely, preparation for a spindle change). At the beginning of the entire cycle of operations, the spindles being wholly withdrawn and the switch 4 providing the logical datum PR (clearly denoting that the logical datum BA of operation without automatic marking is not provided and that $\overline{BA}$ is thus operative), the output datum of the logic operating system cannot be the speed datum selected by its selecting section given that PR or BA would have to be operative for this purpose (as shown in the logic diagram sketched within the block of the operating system 22, FIG. 4). At the instant at which the programming unit delivers a start datum, a switching assembly formed by two logic gates changes position within the logic operating unit 22 owing to the appearance of a datum delta ($\delta$) which, as illustrated in the drawing, is a function of the St (start) PR and ip data. The intermediate datum delta ($\delta$), that is to say the instruction to modify the state of the switching assembly, makes its appearance provided that St and PR are present at the same time, after which this datum delta ($\delta$) is kept in existence until the next pulse ip coming from the position detector. It is apparent that the switching assembly controlled by the delta ($\delta$) function connects the rapid advance datum to the terminal of the logic operating system 22. Thus, provided that the device by means of which this output datum controls the advance of the spindles is in good order, the spindles will be displaced at the speed of rapid advance until the moment in which the position detector indicates that the zero position has been reached by delivering a datum ip. At this particular instant, the switching assembly will return to its position corresponding to the instruction delta ($\bar{\delta}$) and, since the datum of the switch 4 will have changed to PR because the spindles will no longer be in the idle position, the selected speed indication will pass to the output terminal of the logic operating system 22. Since a pulse ip will already have occurred by this time for the cycle of selections, this latter will be at its stage beta ($\beta$) in which the slow displacement is that which is selected. Beginning from this moment, and for as long as the programming unit does not deliver fresh data, the cycle of the machining stroke, followed by clearing actions, followed by rapid penetration, then by another machining stroke, etc., as previously described, will continue until a stage is reached after which a spindle change is scheduled to occur.

Figure 1:
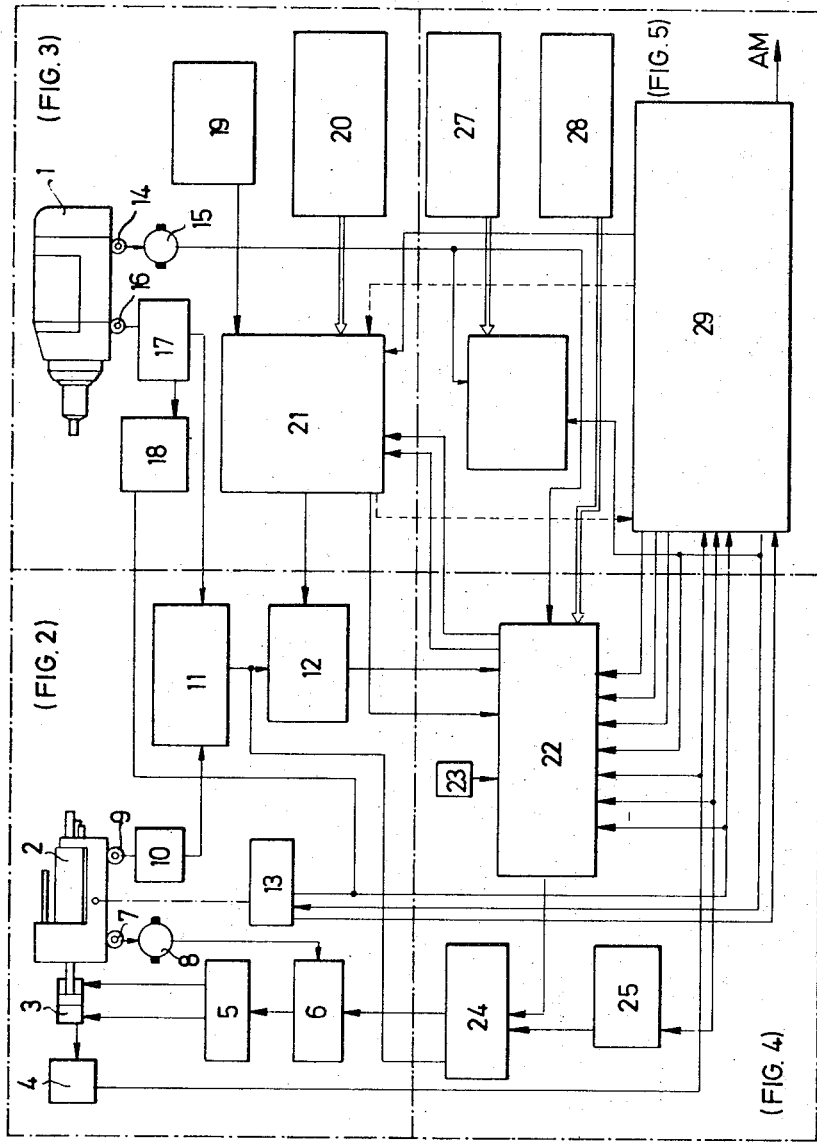
FIG. 1 is a diagrammatical illustration showing the manner in which FIGS. 2, 3, 4 and 5 should be combined to form a functional diagram.

When this last case intervenes, the programming unit will issue a "spindle change" instruction CB, the instant at which this order is issued not having to be very precise, the important fact being that it should be issued during the preceding machining stroke stage. At the instant at which this "spindle change" order is issued, the logic operating system 22 will react in such manner as to cause the spindle to return to a fully retracted position on the occasion of the next clearing action. To this end, another switching assembly formed by two logic gates will come into action at the instant required, this switching assembly being controlled by means of an intermediate datum epsilon ($\epsilon$) which is generated as shown within the frame 22 as a function of the data CB (spindle change), gamma ($\gamma$), PR. In point of fact, the spindle change order produced upon appearance of the datum CB will first be memorized, this memorization causing — only at the instant at which the datum gamma ($\gamma$) (selection of the rapid return speed) will equally appear - the appearance of the intermediate datum epsilon ($\epsilon$) which is then kept in being until the appearance of the datum PR, which appearance will cause the disappearance of the datum epsilon ($\epsilon$) [and thus the appearance of epsilon ($\bar{\epsilon}$)] and the zero reset of the element for memorization of the spindle change order CB. In this way, the switching assembly in question will cause the "rapid return" speed indication to the output terminal of the logic operating system 22 from the moment in which the selection of the clearing cycle will have established the rapid return speed [stage gamma ($\gamma$)], after which this rapid return speed will be maintained until the spindles have returned to their completely retracted position (idle position) PR. The same situation as that at the beginning of the process will then have been established, and another start St will be required for one of the spindles to resume its displacement towards the headstock. Before causing this fresh start, the programming unit will evidently issue a "spindle change control" order CCB, acting on a spindle change control unit 13 illustrated in FIG. 1. When this unit has performed the spindle change, it may advantageously although not necessarily provide a checking datum SPB (spindle positioning supervision) to the programming unit, so that a fresh start is not sanctioned unless the other spindle is placed in appropriate alignment with the headstock.

When the logic operating system 22 receives the datum DP, that is to say, the datum denoting that the headstock limiting position has been exceeded, in other words, an advance of the headstock to a point such that even a complete retraction of the spindles would not allow of a return to the relative zero position, which is unacceptable whilst a spindle is in course of operation, a final switching assembly of the logic operating system 22 suppresses the transmission of the output datum resulting from the normal operation of this operating system and replaces the same by an output datum scheduling a speed equal to the compensatory displacement MC so that, from this moment on, there should no longer be a relative displacement between the spindle and the headstock; at the same time, for example by means of the programming unit, the datum DP triggers an alarm AM.

Figure 4:
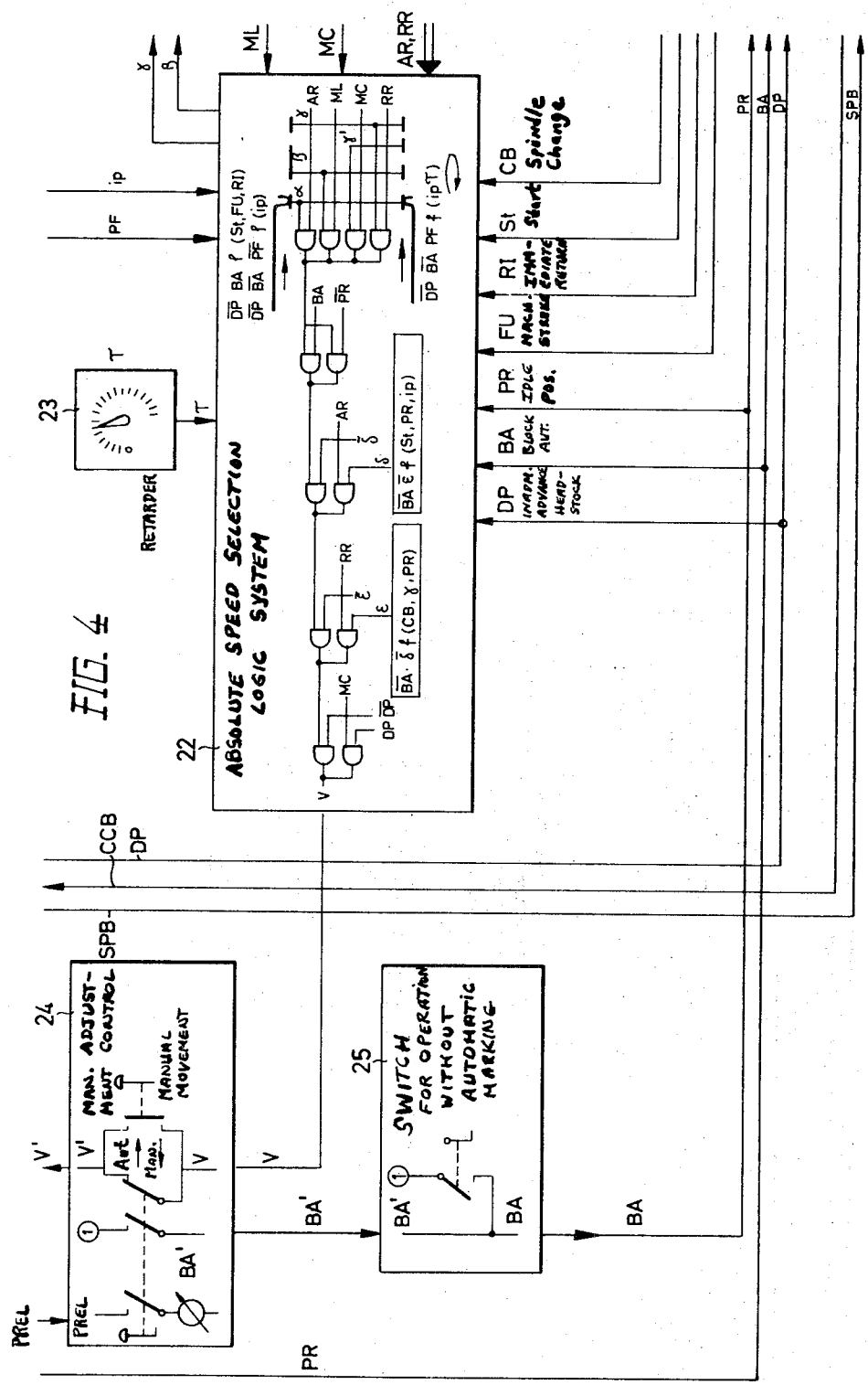

It is apparent from FIG. 4 that an output datum V of the operating system 22 does not pass direct to the speed coupling comparator 6, but through a block for "manual control for manual adjustment." Within this manual adjustment control block is situated a two-position switch, with an automatic position in which the datum V transits to reach the speed coupling comparator 6 in the form of the datum V', and another position in which the passage of the speed datum is interrupted but may be re-established at will by action on a push-button. At the same time too, this switch energizes the zero position adjusting galvanometer and also feeds a datum BA to place the logic operating system 22 in the position of "operation without automatic marking of the settings." When the control block for manual adjustment is in the "manual" position, it is possible to employ the rapid advance, the slow advance, or the rapid return, to bring the spindles close to the headstock. From the instant in which the datum BA ("blocking of automatic system," that is to say "operation without automatic marking of the settings") reaches the logic operating system 22, it is apparent that its selection section will no longer operate this latter as a function of the datum ip, but as a function of the data St (start, same order as in automatic operation), FU (machining stroke, special order for non-automatic operation), and RI (immediate return, special order for non-automatic operation). From this moment on, and by manually providing start, machining stroke (slow movement) and immediate return data, it is possible to displace the spindle at will with respect to the headstock, and it will thus be easy to perform the adjustment of the zero position.

By means of the switch for "operation without automatic marking of the settings" 25, it is equally possible to cause the device to operate by selecting the speeds without recourse to the position detector, only the part of the device previously described being concerned in the generation of the speed values remaining in operation. To this end, the programming unit will have to deliver particular orders for starting, that is to say, for rapid advance, for machining stroke, and for immediate retraction, which orders will then have to be issued by the programming unit at the precise moment at which the required settings are reached.

Figure 5:
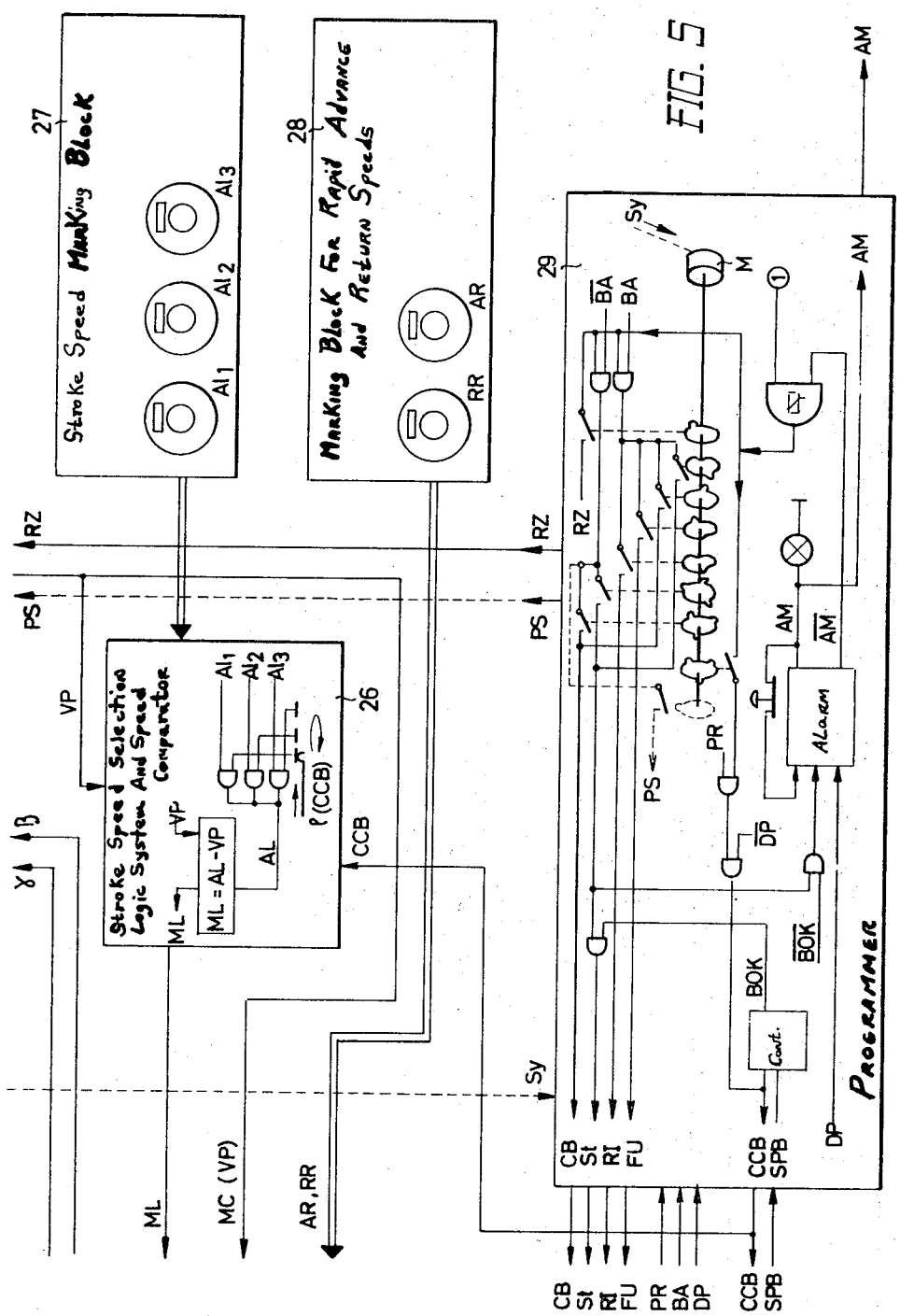

For example, this programming unit may be devised like that which is illustrated at 29 in FIG. 5. It is apparent that it comprises a set of cams of which only four are employed during operation with automatic marking of the settings. These cams are those which provide the start and spindle change data as well as the effective spindle change order and the zero reset order. Since the logic operating system 22 incorporates interlocks to prevent a return to the idle position and the start unless permissible in view of the position of the switch 4 (for the start) and in view of the position of the absolute speed selection section (for return to rest for the purpose of a spindle change), the cams for operation with automatic marking of the settings need not be precise within the programming unit, and on the occasion of a change in settings or of a change in machining speed, there will be no need to modify these cams in most cases, particularly since it is also possible to cause a change in the speed of the motor driving these cams (which are not kinematically coupled to the main camshaft of the automatic lathe). Moreover, in the programming unit illustrated in FIG. 5, provision has been made as apparent from the logical diagram of this figure, to bar the possibility of activating an effective spindle change if the datum PR (idle position) does not reach the programming unit, or if there is no absence of the datum DP (headstock overrun, unacceptable advance), which datum – upon being generated – is equally fed to the programming unit in this form of embodiment. In the programming unit illustrated in FIG. 5 provision is made, although this is not absolutely necessary, to verify the position of the spindles.

The datum CCB (spindle change control) and the datum SPB (monitoring of spindle position), are compared in the programming unit, and a datum BOK is delivered only if this comparison shows that everything is in order. The result of this verification would obviously be temporarily negative at the moment in which the spindles are in process of being changed over, but the important condition is that it should be positive at the instant at which the start is initiated. Thus, a positive result of this verification is necessary for the start datum to be able to emerge from the programming unit, without which this start datum is barred by a gate which equally receives the datum BOK issuing from the verifying unit in question. Moreover, if this verification datum BOK is absent at the moment at which the start should be initiated, that is to say if $\overline{BOK}$ prevails, provision is made to trigger an alarm, this alarm being triggered moreover by the datum DP (unacceptable advance of the headstock) and being maintained in existence by a self-sustaining loop, in such manner as not to disappear automatically with the cause engendering the same. The action of this alarm, apart from energizing an acoustic or luminous signal, will be to interrupt the supply of output data of the programming unit, preferably by means of a relay gate.

In the programming unit illustrated in FIG. 5 are equally apparent cams which would have the result of producing data S$t$, RI and FU during operation without automatic marking of the settings. It is apparent that these cams should be much more precise than the cams previously referred to. In the programming unit shown, are also apparent two gates forming a switching assembly which, as a function of the datum BA or $\overline{BA}$ supply either the contacts for the cams intended for entirely automatic operation or the contacts of the cams for operation without automatic marking of the settings.

Let us also note that the programming unit is equipped with a zero reset cam having the action of restoring the initial position of the selection section of the logic operating system 21, at the instant of issue of the spindle change order whereby the first spindle is brought up to replace the last, this operation corresponding to a change of the workpiece to be machined on the headstock. As a variation, the zero reset datum for the logic system 21 could equally originate from another unit than the programming unit, from which the datum "change of workpiece to be machine" could be obtained.

Note will also be taken of the possibility of two variations illustrated in the drawing (FIGS. 3 and 5, by means of the dash-dotted connecting lines PS and SY). The connection PS would be incorporated to supply the logic selection system 21 — at the instant at which a spindle change would occur causing a tapping tool to follow a drilling tool — with a pulse for supplementary advance within its selection cycle, in such manner as to establish as a setting to which the tool is to return in rapid traverse, a marked setting which would not be the setting of the last clearing action but would be an independent setting apt to correspond to the bringing into contact of the tapping (or screw-threading tool) with the surface of the workpiece to be machined which is to be screw-threaded or tapped by means of this tool. For particular other operations which may have to be performed on an automatic lathe, this possibility of making an advance of a complementary step in the selection of the marking elements for the clearing settings could equally prove to be of substantial convenience.

Finally, the linking for transmission of data SY between the logic operating system 21 and the programming unit 29, depicts the possibility of synchronizing the progression of the sequential control performed by the programming unit 29 with the succession of the clearing stages (or workpiece changes) which are selected by the logic operating system 21. In this case, the motor driving the cams of the programming unit could be a simple stepping device, or could despite everything be a constant-speed or variable-speed motor, but with stopping periods and repeated start orders given as a function of the said synchronizing datum coming from the logic operating system 21.

It is appropriate to place special emphasis on the fact that all the logical or electromechanical layouts shown in the drawings to provide explanations for the operation of the three logic or logical operating systems and of the programming unit are merely examples intended to promote an understanding of the operation of the device, a device constructed for practical purposes being liable to have very different structures for these different elements, the important condition being that it should be devised in such manner as to produce logical results which are similar or equivalent to those which would be produced by elements equipped in the manner described.

While there is shown and described present preferred embodiments of the invention, it is to be distinctly understood that the invention is not limited thereto but may be otherwise variously embodied and practiced within the scope of the following claims. Accordingly,

What is claimed is:

1. A control device for an automatic machine tool of the type comprising a mobile headstock, at least one spindle arranged facing the headstock, and drive means to move the spindle axially, said control device comprising electrical control means for controlling the drive means so that in operation the axial displacement of each spindle is a function of both the speed of displacement and the position of the headstock, said electrical control means comprising: positional pickup and transducer means for detecting and converting into an electrical value the position of the headstock; positional pickup and transducer means for detecting and converting into an electrical value the axial position of each spindle; speed pickup and transducer means for detecting and converting into an electrical value the speed of displacement of the headstock; positional comparator means for establishing an electrical value representing the relative position of each spindle and the headstock as a function of the outputs of said positional pickup and transducer means; marking means for marking at least one or more reference settings for said relative position, which reference settings correspond to points at which changes in spindle axial displacement are due to intervene during the consecutive stage of activation of each spindle; a first logic operating system for selection of the reference settings, operating as a function of the cycle of operations of each spindle; coincidence detecting means for detection of coincidences between said relative position and the reference setting selected by said first logic operating system and for delivering coincidence signals upon detection of such a coincidence; marking means for marking at least one or more values of relative axial speed between each spindle and the headstock, specified for machining by tool means carried by these spindles; means for determining absolute speed values for the rapid advance and rapid return of the spindles; a second logic operating system for selection of the scheduled relative speed values, and for comparison between the value of the scheduled relative speed selected and the actual speed of displacement of the headstock, said comparison providing a positive or negative absolute speed value scheduled for the displacement of the spindles during the machining operation; a sequential programming unit for providing operational control data; a third logic operating system for selection of the positive or negative absolute values to be applied consecutively to the spindles in the course of a complete cycle of operations, these values among which this selection is made originating from at least the second logic operating system and from said means for determining absolute rapid speed values, said third logic operating system serving to provide an absolute speed datum for the displacement of each spindle, and for bringing about changes and reversals in the speed of each spindle as a function of said coincidence signals provided by said coincidence detector means and said operational control data delivered by said sequential programming unit, said third logic operating system supplying said first logic operating system with at least a part of the sequential data required to control its cycle of selections of consecutive reference settings; and servo control means for controlling the speed of displacement of each spindle to assume the value and the direction determined by said absolute speed datum supplied by the third logic operating system.

2. The control device as defined in claim 1, wherein said positional pickup and transducer means are arranged for detection and conversion into analog electrical values of the corresponding positions of the headstock and each of the spindles.

3. The control device as defined in claim 1, wherein said speed detector means are arranged in such manner that the speed of axial displacement of the headstock may be detected and converted into an analog electrical value.

4. The control device as defined in claim 1, wherein said marking means for marking one or more reference settings provide an analog electrical value in representation of these reference settings, said marking means further providing a display for each reference setting marked.

5. The control device as defined in claim 1, wherein said marking means for marking one or more relative axial speed values scheduled for the machining operation, as well as said means for determining the absolute speed values for rapid advance and return, comprise marking elements supplying an analog electrical value representing the value of the speed they mark, said elements further providing a display of each of the speed values marked.

6. The control device as defined in claim 1, especially intended to allow a definite number of clearing actions for the machining operation with each spindle, wherein said marking means for marking one or more reference settings comprise elements for the forming of an analog value, said elements being intended for consecutive marking of the succession of the settings at which it is appropriate to perform clearing actions, and wherein said first logic operating system is arranged for consecutive selection of each of the clearing settings and for supplying said coincidence detecting means with: the setting of the next clearing action during the spindle machining stroke stages, the zero setting corresponding to the positioning of the tool carried by the spindle in alignment with the workpiece to be machined during the rapid clearing return, and the setting of the previous clearing action during the rapid advance of the spindle repositioning the spindle at the point at which the machining action is to proceed more deeply, the coincidence detecting means being arranged to feed said coincidence signals to said third logic operating system each time the relative position of the spindle and the headstock corresponds to the reference settings supplied to it by the said first logic operating system.

7. The control device as defined in claim 1, especially intended to allow for a definite number of clearing actions for machining operation with each spindle, wherein said marking means for marking one or more reference settings comprise elements for the forming of an analog value, said elements being intended for consecutively marking the succession of the settings at which it is appropriate to perform a clearing action, and wherein said first logic operating system is arranged for consecutive selection of each of the clearing settings and for supplying said coincidence detecting means with: the setting for the next clearing action during the stages of machining penetration by the spindles, the zero setting corresponding to the positioning of the tool carried by the spindle in alignment with the workpiece to be machined during the rapid clearing return, and a setting corresponding to a penetration smaller than that of the preceding clearing action during the rapid advance of the spindle repositioning the spindle approximately at the point at which the machining operation is to proceed more deeply, the coincidence detecting means being arranged for supplying said coincidence signals to the third logic operating system each time the relative position of the spindle and of the headstock corresponds to the reference setting supplied to it by the first logic operating system.

8. The control device as defined in claim 1, wherein said means for detecting and converting into an electrical value the position of the headstock are adjustable by temporary disconnection in such manner as to enable the zero value of the electrical value provided by said positional comparator means to be made to correspond to the placing in contact of the leading end of the tool carried by a spindle with the leading face of a workpiece to be machined which is held in the headstock.

9. A control device for an automatic machine tool of the type comprising a mobile headstock, at least one spindle, and drive means to move the spindle axially, said control device comprising electrical control means for controlling the drive means so that in operation the axial displacement of each spindle is a function of both the speed of displacement and the position of the headstock, said electrical control means comprising:
   a. positional pickup and transducer means for detecting and converting into an electrical value the position of the headstock;
   b. positional pickup and transducer means for detecting and converting into an electrical value the axial position of each spindle;
   c. speed pickup and transducer means for detecting and converting into an electrical value the speed of displacement of the headstock;
   d. positional comparator means for establishing an electrical value representing the relative position of each spindle and the headstock as a function of the outputs of said positional pickup and transducer means;
   e. marking means for marking at least one reference setting for said relative position, each reference setting corresponding to respective points at which changes in spindle axial displacement are due to intervene during the consecutive stage of activation of each spindle;
   f. a first logic for selection of the reference settings, operating as a function of the cycle of operations of each spindle;
   g. coincidence detecting means for detection of coincidences between said relative position and the reference setting selected by said first logic;
   h. marking means for marking at least one value of relative axial speed between each spindle and the headstock;
   i. a second logic for selection of scheduled relative speed values, and for comparison between the value of the scheduled relative speed selected and the actual speed of displacement of the headstock, said comparison providing a positive or negative absolute speed value scheduled for the displacement of each spindle during the machining operation; and
   j. servo control means for controlling the speed of displacement of each spindle to assume the value and the direction of said scheduled positive or negative absolute speed value provided by said comparison in said second logic.

10. The control device as defined in claim 9, wherein said positional pickup and transducer means are arranged for detection and conversion into analog electrical values of the corresponding positions of the headstock and each spindle.

11. The control device as defined in claim 9, wherein said speed detector means are arranged in such manner that the speed of axial displacement of the headstock may be detected and converted into an analog electrical value.

12. The control device as defined in claim 9, wherein said marking means for marking at least one reference setting provide an analog electrical value representing said reference setting, said marking means further providing a display for each reference setting marked.

13. The control device as defined in claim 9, wherein said marking means for marking at least one relative axial speed value scheduled for the machining operation comprise marking elements supplying an analog electrical value representing the value of the speed they mark, said elements further providing a display of each of the speed values marked.

* * * * *